(12) United States Patent
Patterson et al.

(10) Patent No.: US 6,267,704 B1
(45) Date of Patent: Jul. 31, 2001

(54) SERVO THREE-SPEED PLANETARY HUB

(75) Inventors: Sam H. Patterson, Chicago, IL (US); Werner Steuer, Schweinfurt (DE)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/528,221

(22) Filed: Mar. 17, 2000

Related U.S. Application Data

(60) Provisional application No. 60/125,011, filed on Mar. 18, 1999.

(51) Int. Cl.[7] ........................................................ F16H 3/44
(52) U.S. Cl. ............................................. 475/298; 475/299
(58) Field of Search ................................... 475/298, 297, 475/299; 192/217.4, 94, 48.91

(56) References Cited

U.S. PATENT DOCUMENTS

| | | | |
|---|---|---|---|
| 5,855,530 | * | 1/1999 | Huang et al. ............... 475/289 |
| 6,120,409 | * | 9/2000 | Hawkins ...................... 475/275 |

FOREIGN PATENT DOCUMENTS

411192992 * 7/1999 (JP) .

* cited by examiner

*Primary Examiner*—Sherry Estremsky
*Assistant Examiner*—Tisha D. Lewis
(74) *Attorney, Agent, or Firm*—Piper Marbury Rudnick & Wolfe; Jefferson Perkins, Esq.

(57) ABSTRACT

A multiple-speed transmission wheel hub for imparting torque to a drive wheel includes a hub shell formed around a wheel axis and a clutch wheel formed around the wheel axis and axially movable between at least first and second speed positions. First gearing couples the clutch wheel to the hub shell when the clutch wheel is in the first position producing a first transmission speed. Second gearing couples the clutch wheel in the second speed position with the hub shell producing a second transmission speed. A speed-shifting cam is disposed on the axis and axially rotatable between at least first and second speed positions, with helical segments formed on a surface of the clutch wheel facing the cam, the helical segments coupling to the cam to translate rotation of the cam into axial displacement of the clutch wheel both from the second speed position to the first speed position and from the first speed position to the second speed position.

16 Claims, 10 Drawing Sheets

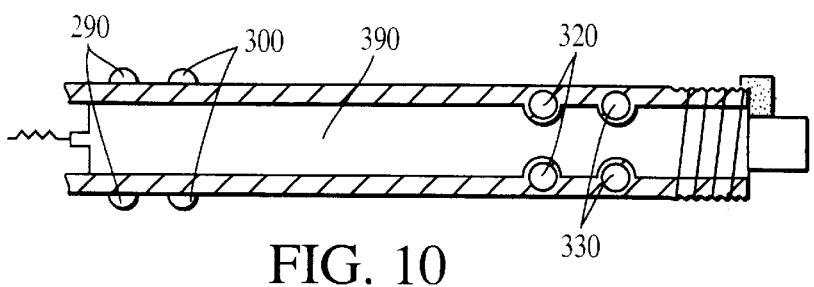 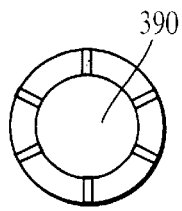
FIG. 10  FIG. 11
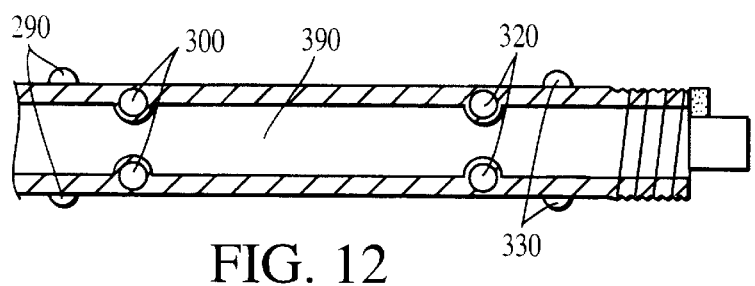 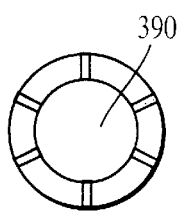
FIG. 12  FIG. 13
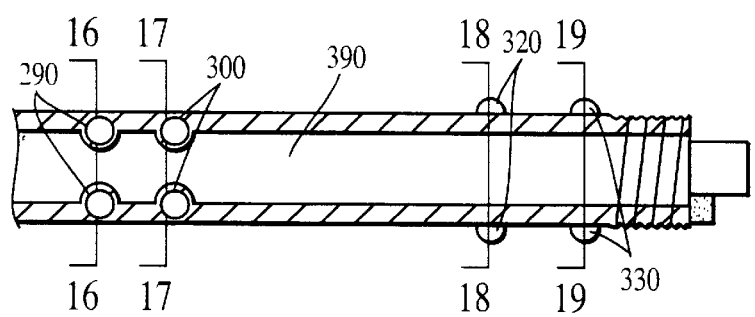 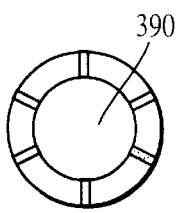
FIG. 14  FIG. 15
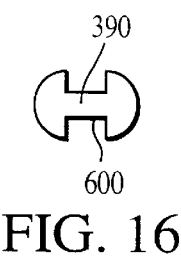   
FIG. 16  FIG. 17  FIG. 18  FIG. 19

SERVO THREE-SPEED PLANETARY HUB

RELATED APPLICATIONS

This application claims the benefit under 35 U.S.C. §119 (e) of U.S. Provisional Application No. 60/125,011, filed Mar. 18, 1999.

TECHNICAL FIELD OF THE INVENTION

The invention pertains to the use of a servo principle for a three-speed hub to shift between three speeds regardless of the load through the transmission and with negligible effort to actuate the shift. The invention uses a sloped, periodic camming action to force the shifts in both the upshifting direction and in the downshifting direction.

BACKGROUND OF THE INVENTION

In conventional three speed internal hub transmissions used on bicycles, the load path and therefore the gear ratio is controlled by the position of an element called the "clutch wheel" or "claw clutch". The clutch wheel moves axially along the axle between three axial positions. In conventional designs which are currently in use in the marketplace, the axial position of the clutch wheel is controlled in one direction by a pull chain, cable, or pushrod/bell crank mechanism and in the other direction by a return spring.

When the transmission is transmitting a load, the splines at each end of the clutch wheel are loaded circumferentially and the resulting friction prevents easy axial movement. In order to make the transmission shift under more than zero load, the preload in the return spring is increased. In order to make the transmission shift under more load than this, the preload must be increased proportionally to the load through the transmission. This increase in preload of the return spring must ultimately be overcome by effort at the hand actuator on the handlebar. The preload needed to make the conventional design shift under load makes this effort excessive.

It is therefore desirable to find another source of axial force or forces to move the clutch wheel in both the up and down shifting directions. Ideally it would also be desirable to find a source of axial force that is always proportional to the load through the transmission and is therefore always great enough to overcome the frictional forces that oppose this movement.

European Patent Application 876953 discloses a mechanism which uses a servo principle to move the clutch wheel. As shown in FIGS. 1–4, this mechanism upshifts in a conventional manner using no servo effect to "force" the upshift. Movement of the clutch wheel in the upshifting direction is effected by a displacement of the control cable 73b toward the handlebar actuator. This rotates a bellcrank 71 which pushes on pushrod assembly 69 and 68 (FIG. 2). A preloaded spring 60 is therefore compressed below its installed length and transfers the force to control element assembly 66 and 49. The axial force is then transferred to a clutch wheel 45 by means of a snap ring 63 (FIG. 3). The force to move the clutch wheel 45 in the upshifting axial direction is the result of the energy put into the hand actuator on the handlebar minus the inefficiencies of all the interactions between the handlebar actuator and the clutch wheel. The control elements 69, 68, 60, 66 and 49 must move axially to displace the clutch wheel 45 the same axial distance.

The mechanism downshifts in a servo manner. To initiate a downshift, the cable 73b and the bell crank 71 release the control elements 69, 68, 60, 66, and 49 so that another preloaded spring 61 can apply an unopposed force on an element 49. When the cam lobes on the inside diameter of the clutch wheel permit it, element 49 moves into a valley 47a between the cam lobes. Element 49 simultaneously slides along helical slot 21b in the axle. The angles between the helical slot 21 in the axle and the helical cam inside the clutch wheel cooperate in such a way that the control element 49 becomes axially fixed and therefore the rotation of the clutch wheel is converted to axial displacement as control element 49 slides up helical cam ramp 47c. As in the case of the upshifting sequence, elements 69, 68, 60, 66, and 49 move axially to accomplish a displacement of the clutch wheel the same axial distance.

One feature that distinguishes the present invention from the device disclosed in EP 876953 is that the helical camming servo effect works in one direction only in the aforementioned prior art. Furthermore, in this prior art construction, to be fully enabled to both up and down shift, the device must use both the helical camming servo effect and the conventional simple non-servo pushing method.

The use of an axially moving control element also has certain drawbacks. In a three-speed hub, it must protrude out of the end of the axle at least as much as the combined stroke of two shifts. This is a very vulnerable place to put a delicate, protruding control element. It is also awkward to convert cable displacement into control element displacement because of the 90-degree difference in orientation. The axially moving control element is also awkward to control with a gear motor since a gear motor in its simplest form is most suitable to deliver rotation, not sliding, axial movement. Also, as a general engineering principle, rotation is preferable to sliding because it is less susceptible to cocking and jamming.

SUMMARY OF THE INVENTION

The present invention answers these deficiencies because it employs a helical camming servo effect for moving the clutch wheel in both the up and down shifting directions and completely eliminates the need for the conventional control element to push the clutch wheel by moving axially itself. The present invention also uses a control element which is simply rotates.

A multiple-speed planetary hub mechanism according to the invention comprises a rotatable control cam having a plurality of axially noncylindrical camming surfaces. A clutch wheel is located about the control cam, and a plurality of ball sets are located between the clutch wheel and the control cam. As the control cam rotates, the ball sets engage selectively are radially urged outwardly by the control cam camming surface and selectively interact with camming surfaces on the clutch wheel. The movement of the ball sets against the camming surfaces produces an axial movement of the clutch wheel. The change of axial position of the clutch wheel alters the transmission load path through the hub assembly.

DESCRIPTION OF THE DRAWINGS

FIG. 10 is a side view of the control cam and ball pairs when the hub mechanism is in the low gear position.

FIG. 11 is a right end view of the control cam of FIG. 10.

FIG. 12 is a side view of the control cam and ball pairs when the hub mechanism is in an intermediate gear position.

FIG. 13 is a right end view of the control cam of FIG. 12.

FIG. 14 is a side view of the control cam and ball pairs when the hub mechanism is in a high gear position.

FIG. 15 is a right end view of the control cam of FIG. 14.

FIG. 16 is a sectional end view of the control cam along lines 16—16 of FIG. 14.

FIG. 17 is a sectional end view of the control cam along lines 17—17 of FIG. 14.

FIG. 18 is a sectional end view of the control cam along lines 18—18 of FIG. 14.

FIG. 19 is a sectional end view of the control cam along lines 19—19 of FIG. 14.

DETAILED DESCRIPTION OF THE INVENTION

Figure 5:
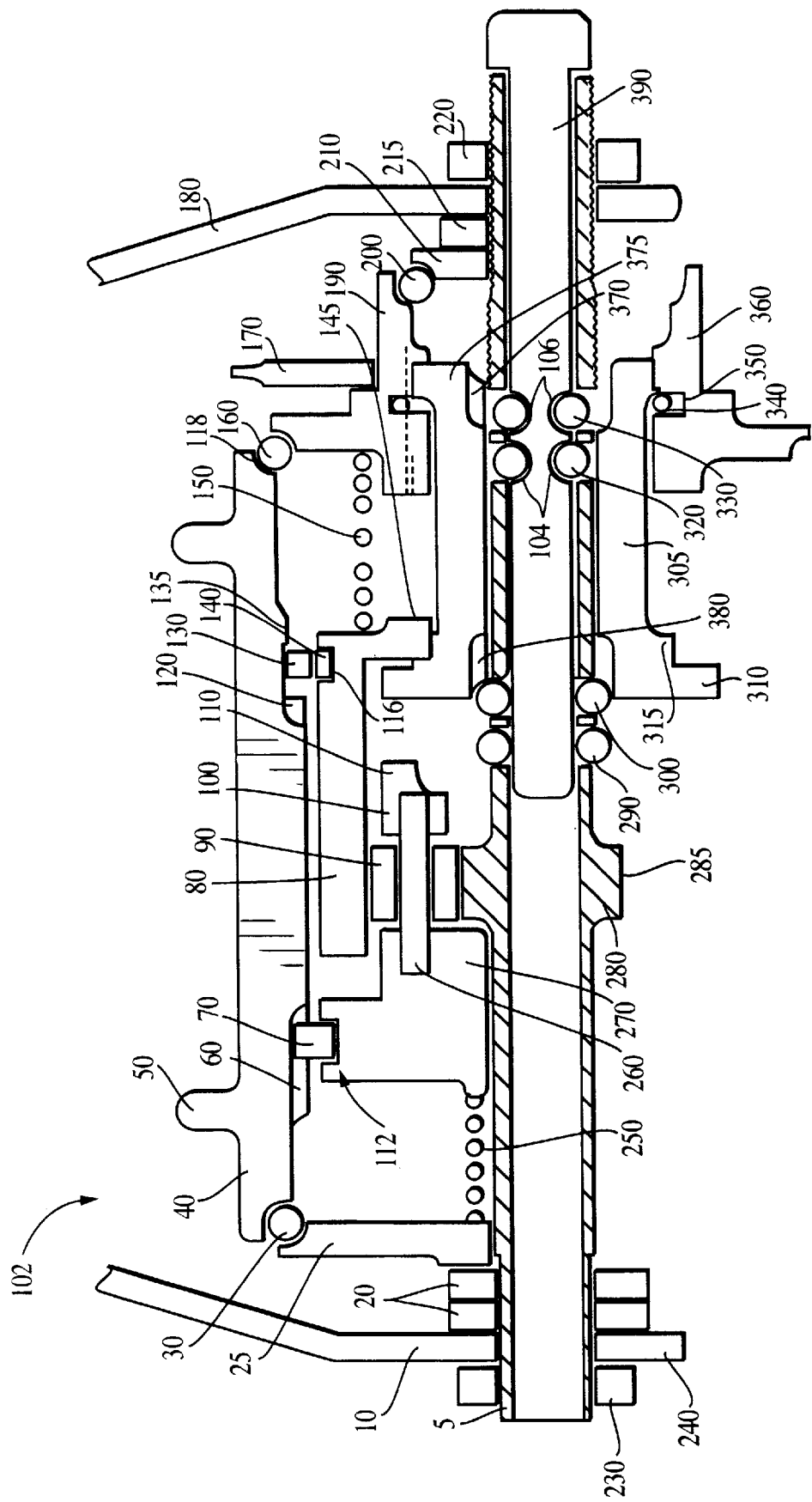
FIG. 5 is an axial view of an entire hub assembly according to one embodiment of the present invention.

The elements of the hub assembly 102 are shown in FIG. 5. Elements 10 and 180 are bicycle frame members or dropouts for holding an axle 5. The hub assembly is retained in the dropouts by threaded axle nuts 230 and 220.

The hub assembly 102 is built on the axle 5 by first installing four control ball pairs, 290, 300, 320, and 330. Then a control cam 390 is installed by inserting it into the tubular axle 5. The control cam 390 is rotated to a low gear position so that control ball pairs 320 and 330 are retracted into grooves 104 and 106 and flush with the outside diameter of the axle 5. In this position a clutch wheel 305 can be slid into place.

A planet carrier body 112 consists of elements 270, 100, and 110. The main body 270 of the planet carrier 112 supports a plurality of one way ratchet pawls 70 and planet shafts 260. The ratchet pawls are spring loaded (springs not shown) in the radially outward direction. Planet carrier body elements 100 and 110 are preferably formed to be integral with the main body 270; in this cross section they appear to be separate, but that is only because of recess 114 required for the planet gear 90. Element 100 supports the other end of planet shaft 260, and element 110 is a castellation oriented axially and formed on element 100. Another set of one-way ratchet pawls 140 (one shown) is installed into pockets 116 in the outside diameter of a ring gear 80. The pawls 140 are spring loaded (spring not shown) in the radially outward direction.

A slip ring 130 is snapped past a ridge 135 of a hub shell 40 and is trapped axially between ridge 135 and a set of ratchet teeth 120 formed in the hub shell 40. Another set of ratchet teeth 60 are integral with the hub shell 40 and engage with ratchet pawls 70. Radially outwardly projecting spoke flanges 50 are also integral with the hub shell 40 and are used for mounting the spokes of the bicycle wheel.

An input sprocket 170 is installed onto an input shell 190. A snap ring 340 is installed into a snap ring retention groove 350. The ring gear 80 is slid over the clutch wheel 310. Next, a helical ring gear spring 150 is placed against the ring gear 80 and bearing balls 160 (as trapped in a carrier, not shown) are placed over the spring. An input shell 190 is then installed over the splines 375 formed on the outboard end of the claw clutch 305. Bearing balls 200 (trapped in a carrier, not shown) are then placed against the bearing race formed into the outboard end of the input shell 190. Then, an outboard bearing cone 210 is threaded onto the axle 230 and retained with axle nut 215.

Next, the hub shell 40 is placed so that the bearing race 118 on the drive (in FIG. 5, rightward) end of the shell 40 is against bearing balls 160. Then the planet carrier 270 is placed over the axle 5 and against the non-drive (leftward) side of a sun gear 285 that is preferably formed to be integral with the axle 5. In this position, the planet gears 90 are meshed with the sun gear 285 and the ring gear 80. Then bearing balls 30 are placed against the bearing race 122 on the non drive (leftward) end of the hub shell 40. Next, a helical planet carrier positioning spring 250 is installed over the axle 5. A non-drive side bearing cone 25 is then threaded onto the axle 5, trapping and preloading spring 250 and loading all of the bearing balls 30, 160, and 200. Locknuts 20 are threaded onto the non-drive end of axle 5 to adjust and secure the position of cone 25. The hub assembly is secured to the bicycle dropouts 10 and 180 by tightening axle nuts 230 and 220.

Figure 6:
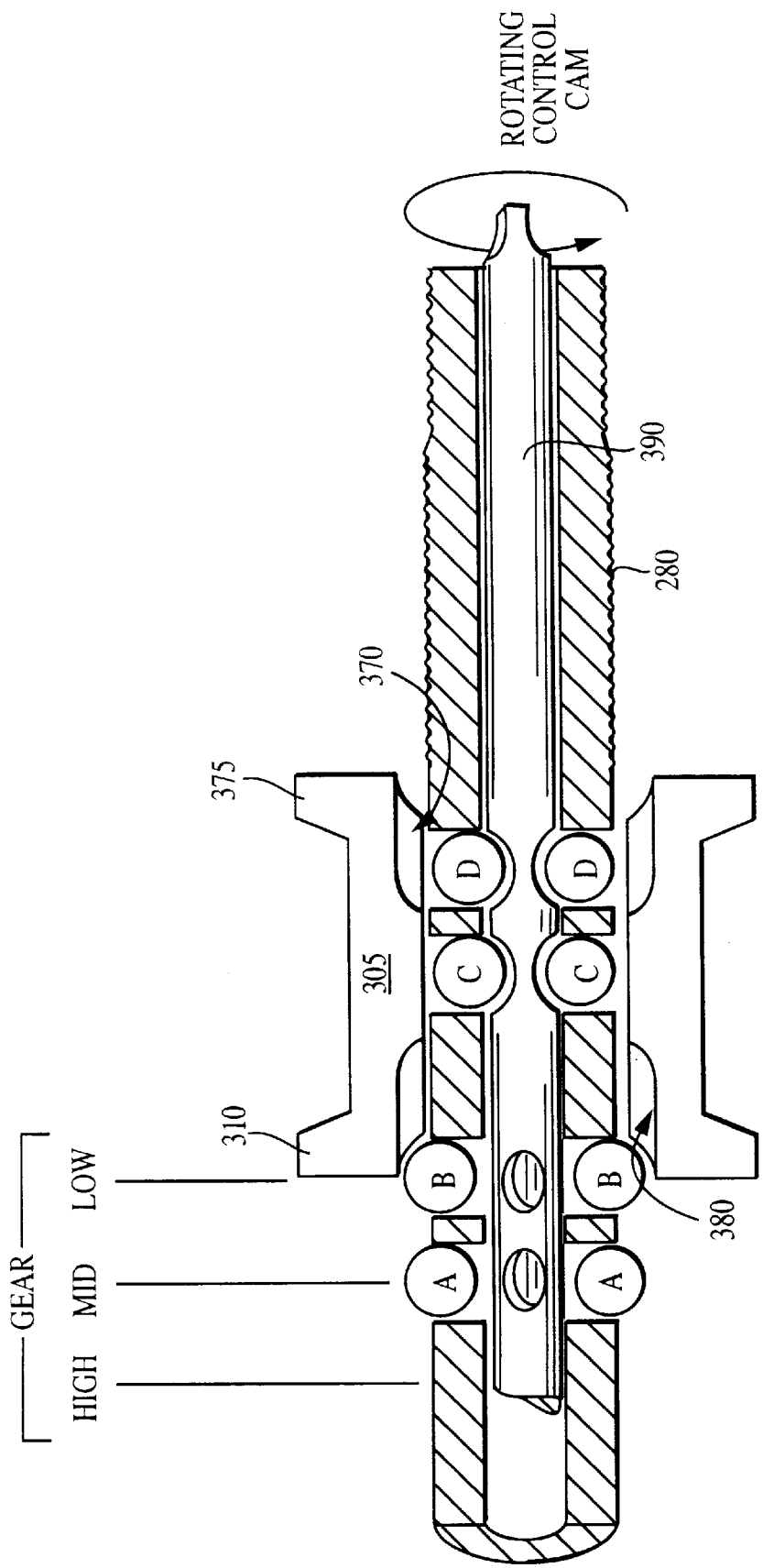
FIG. 6 is a detailed axial view of the clutch wheel, axle, and control elements shown in FIG. 4.
Figure 7:
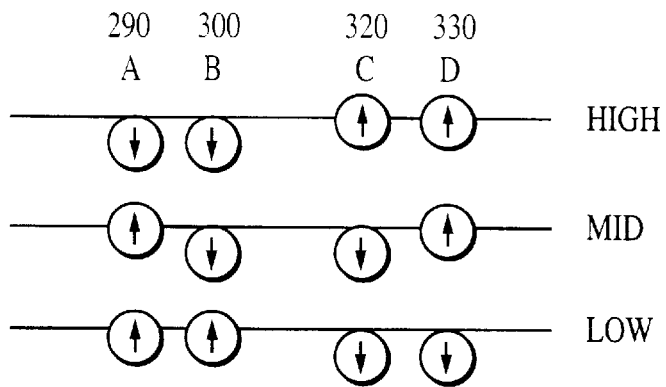
FIG. 7 is a schematic view of the control ball pair dispositions for each of the three gear selections.

The method of operation is shown in FIGS. 5–7. When the load path and corresponding gear ratio are in low gear (as shown in FIG. 5), the load path starts at the input sprocket 170 (which is engaged to a conventional bicycle chain) and is transferred to the input shell 190 by splines (not shown) between the input sprocket 170 and the input shell 190. Then the load is transferred by means of splines 375 on the inside diameter of the input shell 190 to the splines on the outboard end of the clutch wheel 305. The load is then transferred to the ring gear 80 by means of inboard splines 315 on the clutch wheel 305 and corresponding splines 145 on the ring gear 80. The ring gear 80 then turns the planet gears 90 around the sun gear 285. This rotates the planet carrier 270 at a slower speed than the input sprocket 170. The planet carrier 270 then rotates the hub by means of one way ratchet pawls 70 engaging ratchet teeth 60 in the hub 40.

Figure 20:
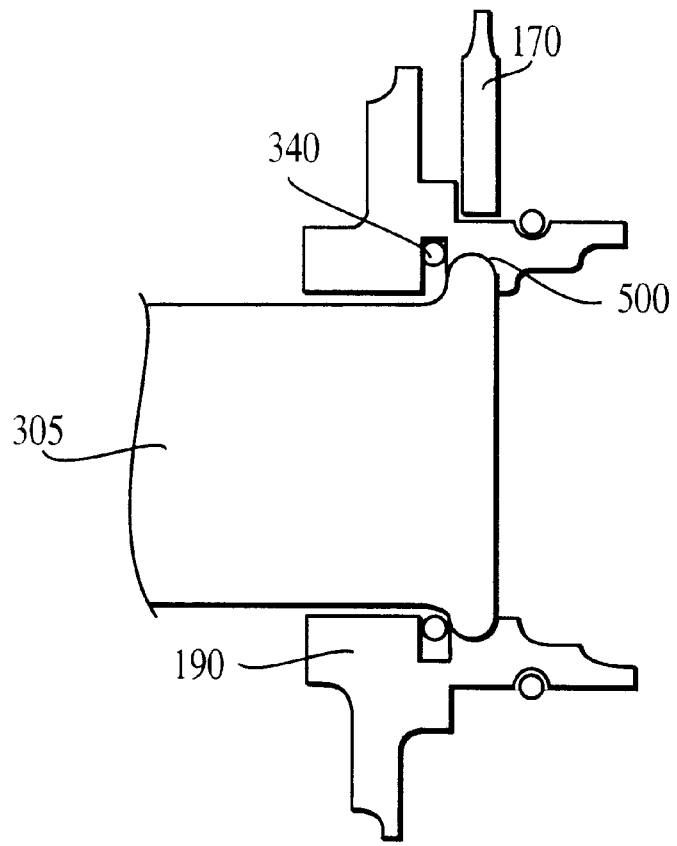
FIG. 20 is a view of the snap ring arrangement for maintaining the clutch wheel in the low gear position.
Figure 21:
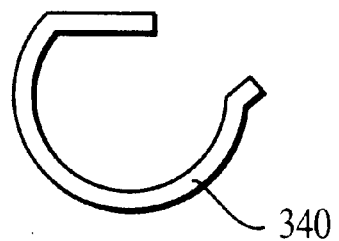
FIG. 21 is a side view of the snap ring of FIG. 20.

In the low gear position, the snap ring 340 engages a specially shaped spline 500 on the clutch wheel 305 to form a detent or temporary retention mechanism to oppose the effect of ring gear return spring 150. The spline 500 is contoured in order to cooperate with the D-shaped snap ring 340. The detent is just strong enough to overcome return spring 150. During a shift from low to middle gear the detent releases the clutch wheel 305 from the input shell 190 to permit it to move to the left to engage middle gear. The interaction of the spline 500 and the snap ring 340 is shown in detail in FIGS. 20–21.

Figure 9:
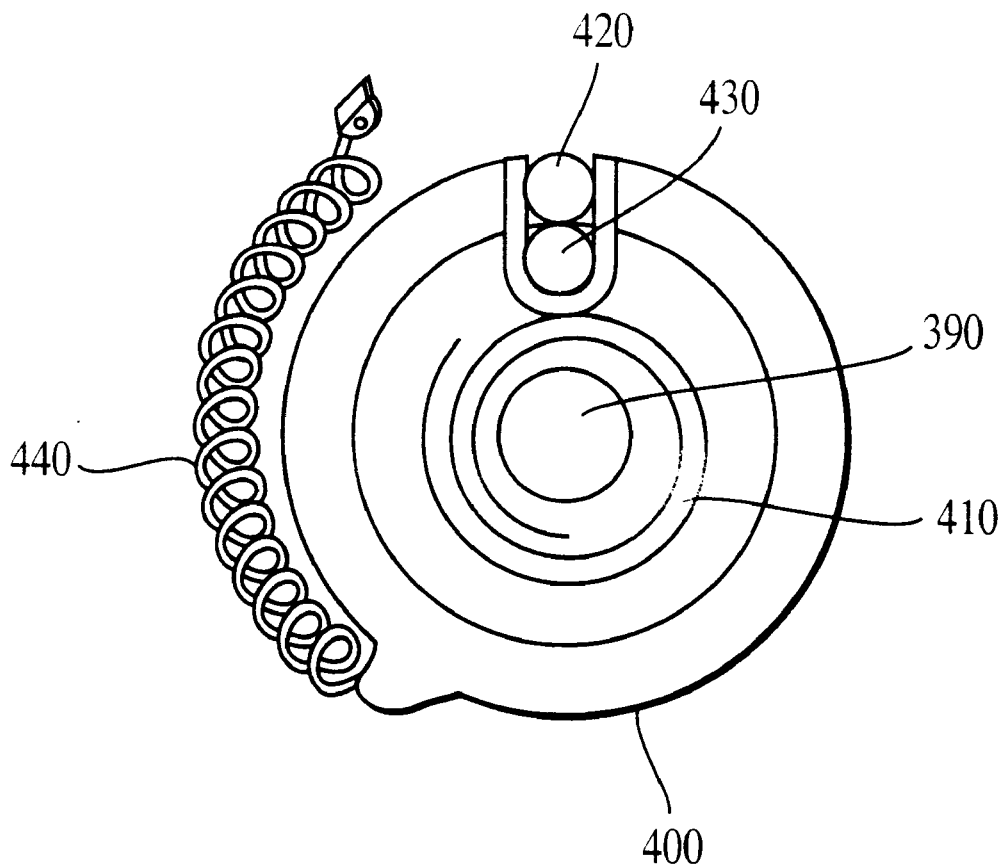
FIG. 9 is a view of the turning mechanism for rotating the control cam between gear positions.

When it is desired to shift the transmission from low to middle gear, the following sequence occurs. First the rotating control cam 390 is rotated to allow control balls 300 to recess inside the axle and then the control cam 390 displaces and locks control balls 330 radially outwardly. As shown in FIG. 9, this is accomplished by use of a spool 400 that is biased by a spring 440 against a cable (not shown). The cable originates from the hand controls near the front of the bicycle. A saver spring 410 urges the control cam 390 to match the rotational position of the spool 400. This occurs due to the saver spring's 410 tendency to keep the spool pin 420 and cam pin 430 in alignment with each other. The saver spring 410 also has some flexibility in one embodiment of the invention in order t o allow a temporary misalignment when the control cam rotation cannot be accomplished immediately. In this position the control balls 330 will interact with the outboard sloped, periodic camming surfaces 370 on the inside diameter of the clutch wheel 305 in such a way as to convert rotation of the clutch wheel 305 into leftward (as seen in FIG. 5) axial displacement of the clutch wheel 305. FIG. 5 further shows the relative placement of each of the control balls 290, 300, 320, and 330 and the rotating control cam 390 in low gear.

Figure 8:
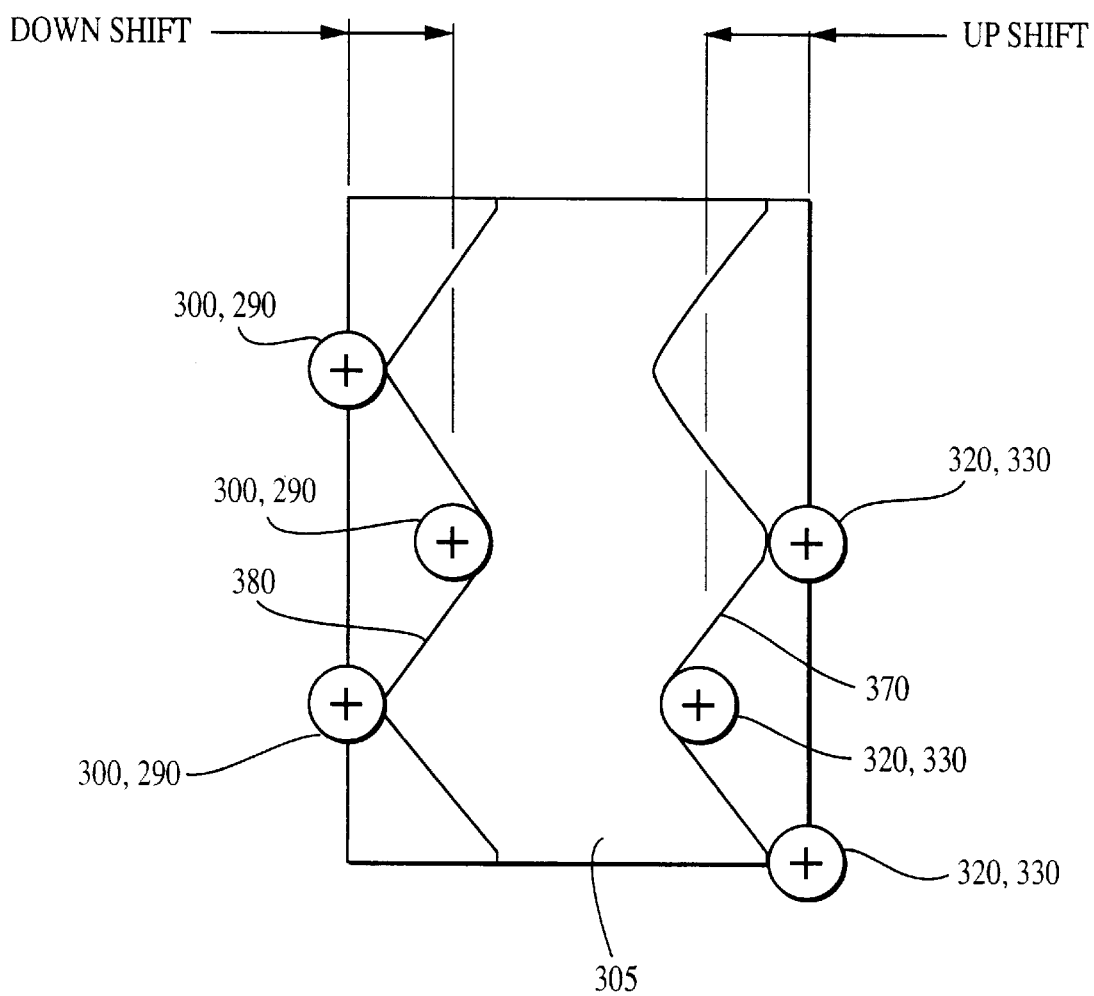
FIG. 8 is a view of the inside diameter of the clutch wheel as if it were unrolled, showing the relative locations of the ball pairs for different gear positions.

The camming surfaces 370 and 380 are not helical when taken as a whole, but rather are composed of a series of alternating right-handed and left-handed helical segments of substantially equal length which are joined together by several transitions which make peaks and valleys. FIGS. 10–15 show the relative positions of the transitions and ball pairs when the control cam 390 is in the low, intermediate, and high gear positions. FIGS. 16–19 show various cross-sections of the control cam 390 when the hub mechanism 2 is in a high gear position. As can be seen in the drawings the two middle ball pairs 300 and 320 are prominent and active for one of three positions and retracted and inactive for the other two positions. It is for this reason that the valleys 610 and 620 shown in FIGS. 17 and 18 are smaller than the valleys 600 and 630 shown in FIGS. 16 and 19. A schematic of the helical camming surfaces on the inside diameter of the clutch wheel 305 is shown in FIG. 8. FIG. 8 shows the inside diameter of clutch wheel 305 as if it were unrolled or laid flat. The axial distance from a peak to a valley of the cammed surface 370 or 380 corresponds to the stroke required for one shift. In the illustrated embodiment, the stroke for the shift from low to middle gear is substantially the same as for the shift from middle to high gear. Also the strokes from high to middle and from middle to low are substantially the same. This need not be the case. The same upshifting camming surfaces 370 are used for the shifts from low to middle and from middle to high. For the first shift from low to middle, the cammed surface 370 interacts with balls 330. For the shift from middle to high the cammed surface 370 interacts with balls 320. The relative positions of each of the balls 290, 300, 320 and 330 for the low, middle, and high gears is shown in FIG. 6.

When the clutch wheel 305 moves to the left, the ring gear 80 is forced to follow by the ring gear return spring 150. Ring gear ratchets 140 drag slip ring 130 to the left until the slip ring 130 is stopped by the ratchet teeth 120. At this point, the ring gear 80 and ratchets 140 continue to move to the left placing the ratchets 140 under the ratchet teeth 120 then escaping from under the slip ring 130 so that the ratchets engage the ratchet teeth 120.

For the load path corresponding to middle gear, the load path is transferred directly from the ring gear 80 to the hub by means of the ratchet teeth 140. The planetary gear system is bypassed and the hub shell 40 rotates at the same speed as the input sprocket 170. In this condition the transmission is in "lock out" or in a one to one condition. In this condition, the ratchets 70 are overdriven.

Figure 1:
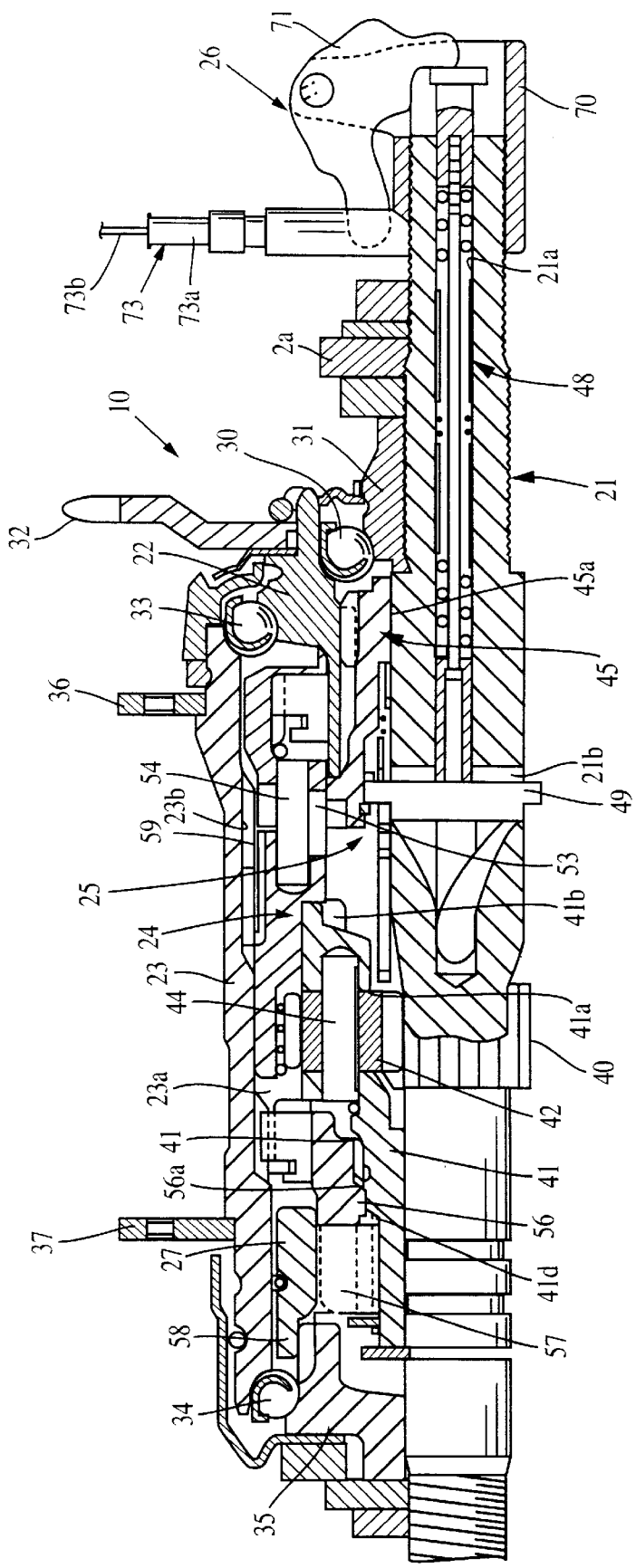
FIG. 1 is a cross-sectional view of an internal hub transmission according to the prior art.
Figure 2:
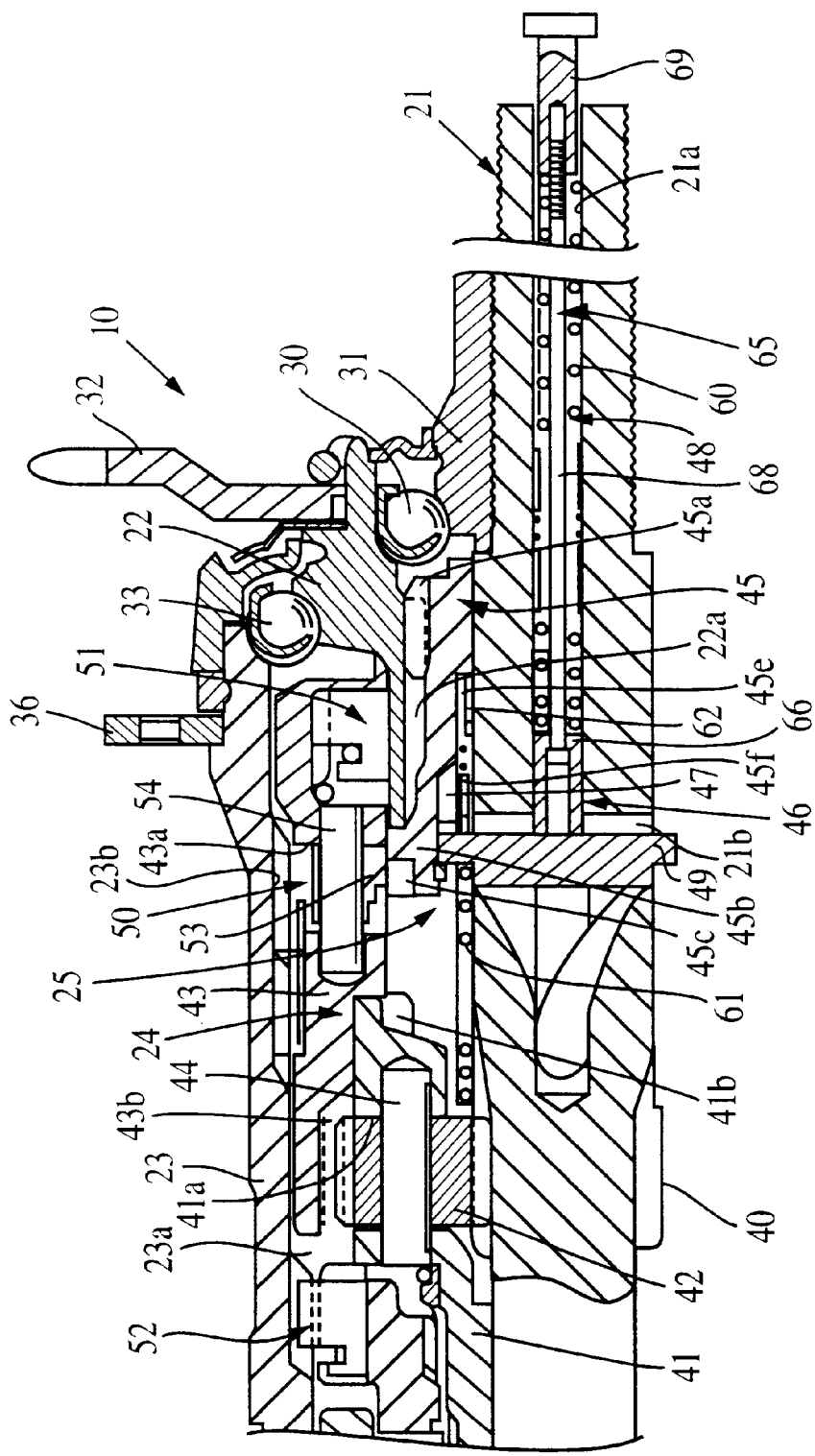
FIG. 2 is a detailed view of the internal hub transmission shown in FIG. 1.
Figure 3:
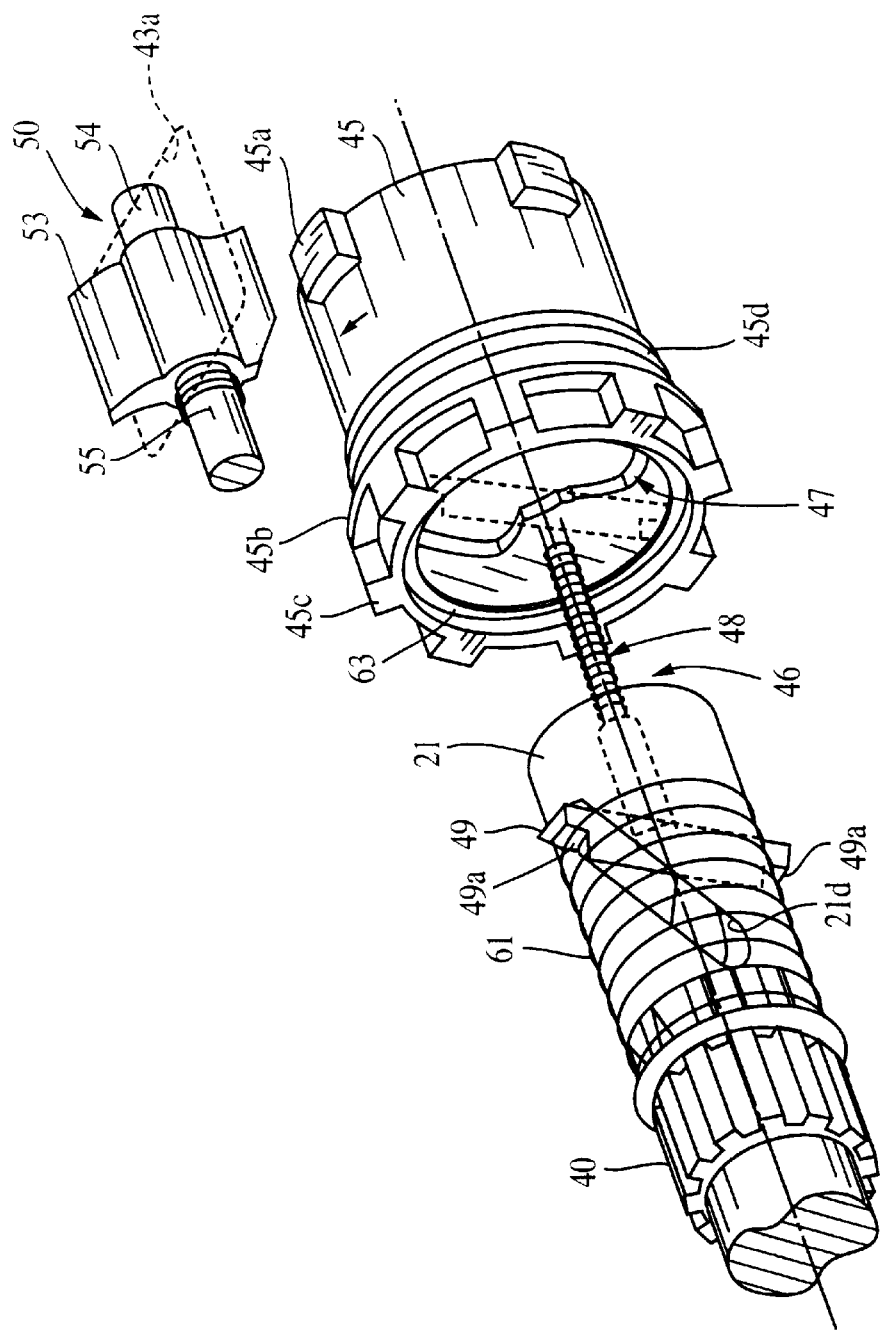
FIG. 3 is an oblique view of portion of the hub transmission shown in FIG. 1.
Figure 4:
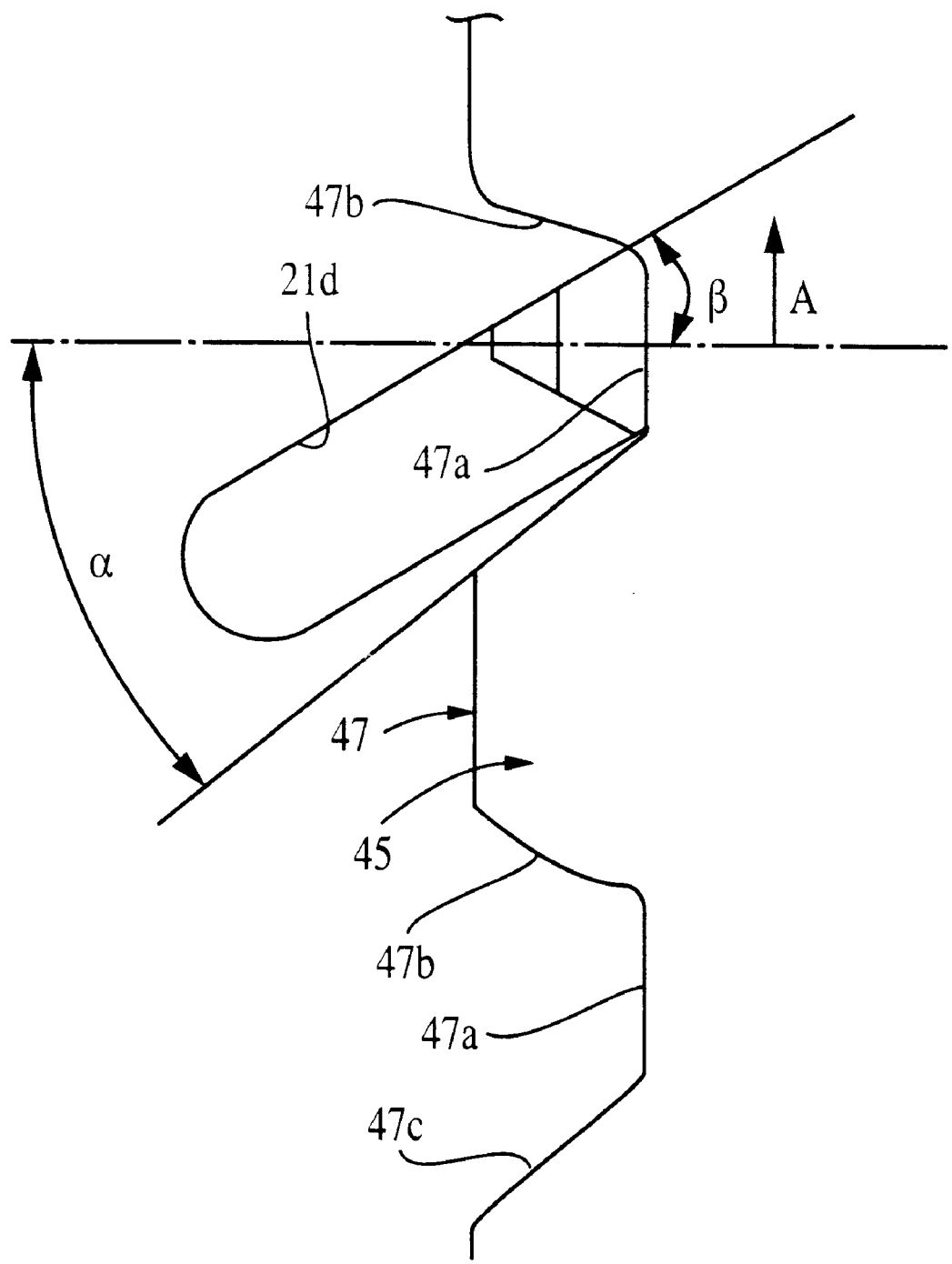
FIG. 4 is schematic view illustrating the operation of the shift key and cam surface in the hub transmission shown in FIG. 1.

When it is desired to shift the transmission from middle gear to high gear, the following sequence occurs. First the rotating control cam 390 is rotated to allow control balls 290 to drop below the outside diameter of the axle 230. Then the control cam 390 displaces control balls 320 into the up and locked position. In this position, the control balls 320 interact with the helical camming surfaces 370 on the inside face of the clutch wheel 305. This interaction converts the rotation of the clutch wheel 305 into axial motion to the left in FIG. 4 or in the upshifting, axial direction. The ring gear 80 is prevented from moving as far to the left as the clutch wheel 305 because it comes up against the planet carrier 270. This causes the splines 145 on the ring gear 80 to disengage from the splines 315 on the clutch wheel 305. Another set of splines 310 on the clutch wheel 305 then engage corresponding castellations 110 on the planet carrier 270.

For a load path corresponding to high gear, when the castellations 110 on the planet carrier 270 are driven by the splines 310 on the clutch wheel 305, the load is transferred from the clutch wheel 305 to the planet carrier 270. This is the overdrive condition. The planet carrier 270 and rotating planet gears 90 drive the ring gear 80 at a higher speed than the input sprocket. The load is transmitted from the ring gear to the hub by means of the ratchets 140 and ratchet teeth 120. In this condition the ratchets 70 are overdriven.

When it is desired to shift the transmission from high to middle gear, the following sequence occurs: First, the rotating cam 390 is rotated to allow control balls 320 to drop below the outside diameter of the axle 230 and then control balls 290 are displaced into the up and locked position. In this position, the balls 290 interact with the down shifting camming surfaces 380. Rotation of the clutch wheel 305 is converted into axial movement of the clutch wheel 305 in the downshifting (in FIG. 5, rightward) direction. As was the case with upshifting, the downshifting camming surfaces 380 are used twice: once for the shift from high to middle and once more for the shift from middle to low.

The load path in middle gear has already been described above and is not influenced by whether it is arrived at by an upshift or a downshift.

When it is desired to shift from middle to low gear, the control cam 390 is rotated to drop balls 330 and raise and balls 300. The camming action between balls 300 and downshifting camming surface 380 converts rotation of the clutch wheel 305 into axial motion of the clutch wheel 305 in the downshifting direction. The leftmost splines 310 on the clutch wheel 305 pull the ring gear 80 to the right so that ratchets 130 are disengaged from ratchet teeth 120. They are completely disengaged at about half the shift stroke. During the rest of the stroke to the right, the ratchets are trapped and pinned under the slip ring 130. The system arrives at the condition shown in FIG. 4 with the ratchets 140 trapped and the slip ring 130 rotating with the ratchets 140. The ratchets will be released when the transmission is shifted into middle gear as described above.

The load path for low gear has been described above.

Regarding the control cam or control cam rod 390, the deployment of control balls in the "up and locked" position is "opportunistic". By this it is meant that depending on the position of the helical cam surfaces 380 and 370, the control balls cannot be arbitrarily forced into the up and locked position. For example they may start up and then get jammed down before they get into the "locked" position. In this case the control rod 390 must be free to return to the start position and try again. Presumably the next try will be successful since the "window of opportunity" at the bottom of a valley in the cams 370 and 380 will reappear. The trick is to use a saver spring, shown in FIG. 9, to gently preload the control cam in the desired direction but not force it until the window of opportunity is wide open.

The "up and locked" position of control balls is achieved by configuring the cam lobes so that the contact angle between the lobe and the ball is tangential to the control cam rod. This way, forces downward on the ball resulting from the strong interaction with the helical camming surfaces 370 and 380 cannot apply a rotational force on the control cam rod 390. It becomes a matter of strength of materials only. Short of the "locked" position, it is desirable that the downward force on the ball can exert a rotational force on the control cam rod 390 to counter rotate it to the start of its motion so it can try again without jamming the whole control mechanism.

Additionally, it is may also be desirable to configure the cam lobes so that the balls being retracted are nearly fully retracted before the balls being deployed up begin to go up.

While several preferred embodiments have been shown and described, it is understood that changes and modifications can be made to the invention without departing from the invention's broader aspects. Thus, it is apparent that alternative embodiments are available to most skilled and development art. Therefore, the present invention is not limited to the described and illustrated embodiment but only by the scope and spirit of independent and dependent claims.

What is claimed is:

1. A multiple-speed transmission wheel hub for imparting torque to a drive wheel, comprising:
   a hub shell formed around a wheel axis;
   a clutch wheel formed around the wheel axis and axially movable between at least first and second speed positions, first gearing coupling the clutch wheel to the hub shell when the clutch wheel is in the first position to produce a first transmission speed, second gearing coupling the clutch wheel with the hub shell when the clutch wheel is in the second speed position to produce a second transmission speed; and
   a speed-shifting cam disposed on the axis and axially rotatable between at least first and second speed positions, helical segments formed on a surface of the clutch wheel facing the cam, the helical segments coupling to the cam to translate rotation of the cam into axial displacement of the clutch wheel both from the second speed position to the first speed position and from the first speed position to the second speed position.

2. A hub mechanism formed around an axis, comprising:
   a coaxial rotatable control cam disposed on the axis, the control cam having a plurality of noncylindrical camming surfaces;
   a clutch wheel coaxial with the control cam, a plurality of clutch wheel camming surfaces formed on a surface of the clutch wheel facing the control cam;
   a plurality of ball sets located between the control cam and the clutch wheel, the ball sets cooperating with the plurality of camming surfaces in the control cam and the clutch wheel;
   wherein the rotation of the control cam changes the relative position of at least one ball set relative to at least one of the camming surfaces of the control cam and at least one of the camming surfaces in the clutch wheel, the change of position of the at least one ball set resulting in the axial movement of the clutch wheel.

3. The hub mechanism of claim 2, wherein each ball set consists of a ball pair.

4. The hub mechanism of claim 2, further comprising an input sprocket disposed on the axis and a coaxially mounted input shell operatively connected to the input sprocket, the input shell and clutch wheel including a plurality of corresponding splines for transmission of a load therebetween.

5. The hub mechanism of claim 2, and further comprising a ring gear formed around the axis and receiving a load from the clutch wheel, the clutch wheel and ring gear including a plurality of corresponding splines for the direct transmission of the load therebetween.

6. The hub mechanism of claim 2, comprising first, second, third and fourth ball sets between the clutch wheel and the control cam, wherein the hub mechanism configures into a low gear when the first and second ball sets cooperate with the camming surfaces in the clutch wheel, an intermediate gear when the first and fourth ball sets cooperate with the camming surfaces in the clutch wheel, and a high gear when the third and fourth ball pairs cooperate with the camming surfaces in the clutch wheel.

7. The hub mechanism of claim 2, further comprising:
   a ring gear operatively connected to the clutch wheel and forming a portion of a load transmission path;
   a hub shell; and
   a sun and planet gear mechanism including:
      a planet carrier body selectively operatively connected to the hub shell;
      a plurality of rotatable planet gears rotatably mounted on the planet carrier body;
      a sun gear disposed axially inwardly of and engaging the planet gears, wherein the planet gear is capable of rotating about the sun gear;
   whereby when the hub mechanism defines a first gear, the load transmitted to the ring gear turns the planet gears around the sun gear, and wherein the axial movement of the clutch wheel causes the ring gear to move axially in substantially the same direction as the clutch wheel between at least first and second axial positions, resulting in a change of the load transmission path between the input sprocket and the hub shell.

8. The hub mechanism of claim 7, further comprising:
   a coaxial slip ring in sliding relation to an interior surface of the hub shell and selectively engaging a plurality of ratchet pawls located on the ring gear; and
   a plurality of ratchet teeth located on the hub shell;
   wherein when the hub mechanism adjusts from a first gear to a second gear, the ring gear ratchet pawls disengage from the slip ring and engage the ratchet teeth on the hub shell.

9. The hub mechanism of claim 8, wherein when the hub mechanism is in a second gear, a load is transferred from the ring gear to the hub shell through the ratchet teeth on the hub shell.

10. The hub mechanism of claim 9, wherein when the hub mechanism is in a second gear, the hub shell rotates at substantially the same velocity as the input sprocket.

11. The hub mechanism of claim 10, further comprising a plurality of castellations formed on the planet carrier, a second plurality of splines on the clutch wheel, wherein when the hub mechanism adjusts from a second gear to a third gear, the ring gear disengages the first splines on the clutch wheel, resulting in the second plurality of splines on the clutch wheel engaging the castellations on the planet carrier.

12. The hub mechanism of claim 11, wherein when the hub mechanism is in a third gear, a load is transmitted from the second plurality of splines on the clutch wheel to the castellations on the planet carrier.

13. The hub mechanism of claim 12, wherein when the hub mechanism is in a third gear, the hub shell rotates at a substantially greater speed than the input sprocket.

14. A hub mechanism, comprising:

a clutch wheel including first and second internal camming surfaces;

a control cam having an outer surface defining a plurality of camming surfaces along the outer surface thereof;

first, second, third, and fourth ball pairs located between the control cam and the clutch wheel, the first and second ball pairs selectively engaging with the first camming surface of the control cam, the third and fourth ball pairs selectively engaging with the second camming surface of the control cam; and a ring gear operatively connected to the clutch wheel, wherein the rotation of the control cam adjusts the positions of at least one of the ball pairs due to the change in the outer surface of the control cam, the interaction of the ball pairs with the camming surfaces causing the clutch wheel to move between at least first and second axial positions.

15. A method for altering the transmission speeds of a hub mechanism, comprising the steps of:

rotating a control cam having a plurality of axially non-cylindrical camming surfaces formed therein;

by rotating the control cam, moving at least one ball set disposed adjacent one of the camming surfaces;

interacting the at least one ball set with a helical camming surface on the inside portion of a clutch wheel; and moving the clutch wheel from a first axial position to a second axial position.

16. The method of claim 15, further comprising the steps of:

rotating the control cam so as to radially displace at least one ball set;

interacting the at least one ball set with a axially noncylindrical camming surface on the control cam; and moving the clutch wheel from the second axial position to the first axial position.

* * * * *